(12) United States Patent  (10) Patent No.: US 8,223,775 B2
Li et al.  (45) Date of Patent: Jul. 17, 2012

(54) ARCHITECTURE FOR A FLEXIBLE AND HIGH-PERFORMANCE GATEWAY CABLE MODEM

(75) Inventors: Gordon Y. Li, San Diego, CA (US); Yoav Hebron, San Diego, CA (US)

(73) Assignee: Entropic Communications, Inc.

( * ) Notice: Subject to any disclaimer, the term of this patent is extended or adjusted under 35 U.S.C. 154(b) by 2220 days.

(21) Appl. No.: 10/675,566

(22) Filed: Sep. 30, 2003

(65) Prior Publication Data

US 2005/0071492 A1  Mar. 31, 2005

(51) Int. Cl.
*H04L 12/46* (2006.01)
(52) U.S. Cl. .......................................... 370/401; 709/249
(58) Field of Classification Search .................... 709/249
See application file for complete search history.

(56) References Cited

U.S. PATENT DOCUMENTS

| 6,944,706 B2 * | 9/2005 | Schain et al. ................. 709/250 |
| 2001/0039600 A1 * | 11/2001 | Brooks et al. ................. 710/126 |
| 2006/0080650 A1 * | 4/2006 | Winters et al. ............... 717/168 |

* cited by examiner

*Primary Examiner* — Patrice Winder
(74) *Attorney, Agent, or Firm* — James Sze; Duane Morris LLP

(57) ABSTRACT

A cable modem system and architecture. A cable modem engine performs all cable modem functions, and a data networking engine performs all data and home networking functions. The cable modem engine is completely partitioned from the data networking engine. DOCSIS and VoIP functionality is implemented in the cable modem engine. The VoIP functionality may be in accordance with the Packet-Cable specification. The data networking functionality provided by the data networking engine may be in accordance with the CableHome specification.

20 Claims, 2 Drawing Sheets

ARCHITECTURE FOR A FLEXIBLE AND HIGH-PERFORMANCE GATEWAY CABLE MODEM

FIELD OF THE INVENTION

The present invention relates to cable modems and, in particular, relates to a cable modem system having a functionally partitioned and flexible architecture.

BACKGROUND OF THE INVENTION

The future gateway cable modem (CM) will provide a wide range of data networking and VoIP services, as exemplified by the requirements for initiatives such as CableHome and PacketCable. The major challenge in designing such a gateway cable modem is integration of these services with the basic cable modem functionality in an efficient and cost-effective. Several objectives need to be met:

Functional Partitioning. The gateway cable modem will incorporate a variety of functions beyond the traditional cable modem, including IP routing, network address translation (NAT)/firewall, virtual private network (VPN), web server and VoIP. These functions need to utilize DOCSIS (Data Over Cable Service Interface Specification)services (link-layer transport and QoS) for wide area network (WAN) access. Partitioning these functions along with other cable modem functions among different computational agents is an essential issue in designing a gateway cable modem.

Flexiblity. The architecture of the gateway cable modem should be flexible enough to allow independent software development and field-upgrade of gateway value-added services and basic DOCSIS cable modem services. From a development standpoint, the architecture should facilitate different software-partnering models, including all in-house, software components licensing, and OEM vendor-differentiating design. From a multiple system operator (MSO) perspective, it is highly desirable to be able to independently provision, maintain and upgrade revenue-producing gateway services and basic broadband access services.

Performance. The gateway cable modem should be able to support a large number of simultaneous data application sessions originated from/terminated on multiple CPE (customer provided equipment) devices. VoIP applications must not be adversely impacted by an concurrent data applications, and the data path for voice packets must be optimized to minimize delay and jitter.

Cost. The gateway cable modem chip should have a small incremental hardware cost/functional increase relative to stand-alone cable modem chips.

Software Re-Use. It should be possible to carry over existing cable modem software to the new gateway cable modem without major changes. The existing software running on network processors should be easily portable to run on the gateway platform without major adaptation.

The present invention provides a gateway cable modem architecture that meets all of these objectives.

SUMMARY OF THE INVENTION

The present invention provides a gateway cable modem system and architecture that meets the above objectives and provides a highly flexible, high performance system capable of handling multiple cable modem voice, data and networking services.

One embodiment of the invention is a cable modem system comprising a data networking engine that performs data networking functions and a cable modem engine that performs all other cable modem functions, wherein the cable modem engine is completely partitioned from the data networking engine.

Another embodiment of the invention is a cable modem architecture. The architecture includes a cable modem engine having a DOCSIS PHY layer with a hardware transmitter and receiver, a DOCSIS MAC processor that implements real-time critical MAC functions for both upstream and downstream communications, and a DOCSIS controller implementing VoIP functionality. The architecture also includes a data networking engine implementing all data networking processing and home networking applications. The data networking engine is completely decoupled from the cable modem engine. In one implementation, the VoIP functionality provided by the cable modem is in accordance with the PacketCable specification and the data networking functionality provided by the data networking engine is in accordance with the CableHome specification.

Another embodiment of the invention is a method for providing a flexible and partitioned cable modem gateway. Data and home networking functionality is provided by a data networking engine, and DOCSIS and VoIP functionality is provided by a cable modem engine. The data networking engine is partitioned from the cable modem engine so that the data and home networking functionality is completely decoupled from the DOCSIS and VoIP functionality.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION OF THE INVENTION

Figure 1:
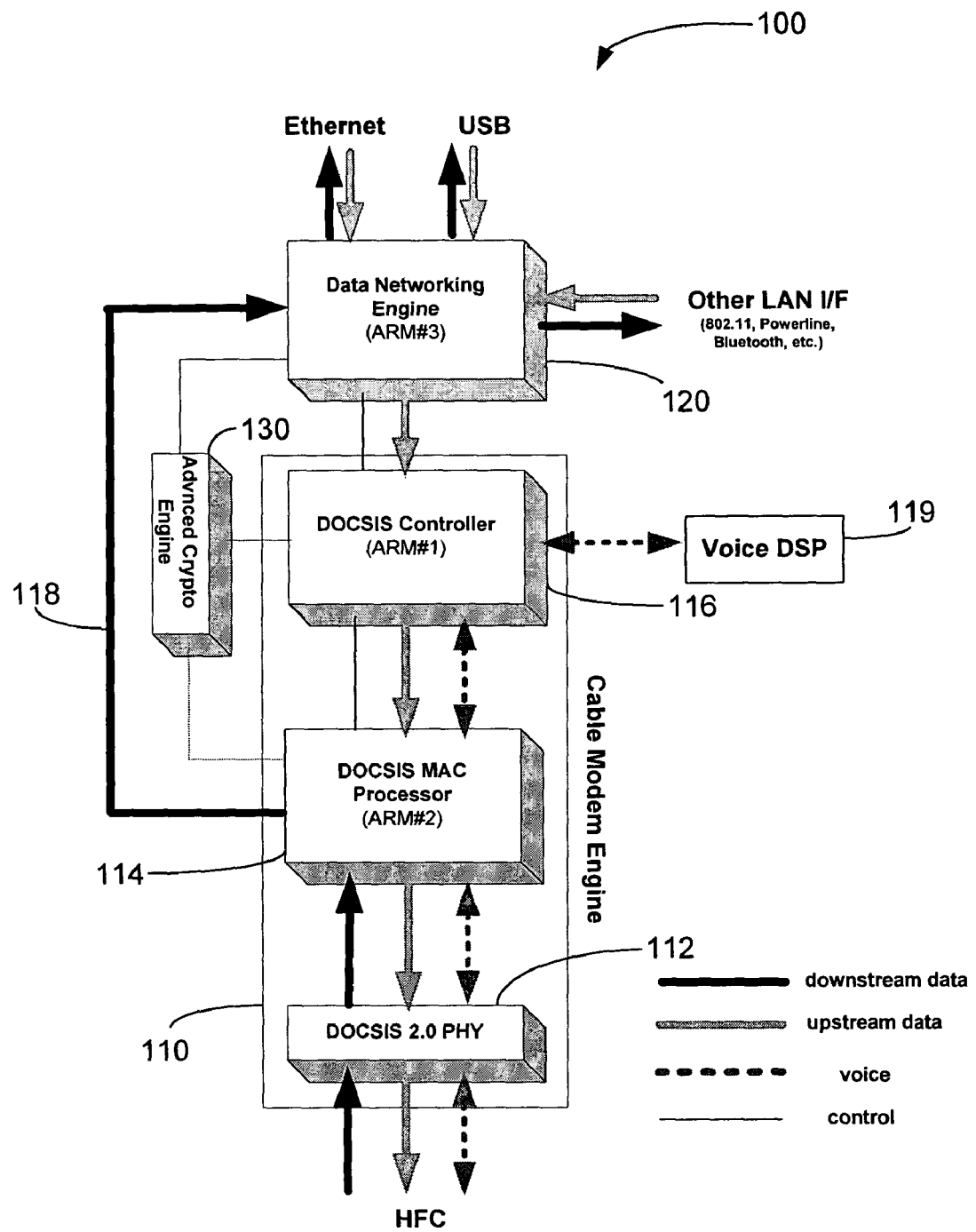
FIG. 1 is a block diagram of a gateway cable modem architecture according to the present invention.

FIG. 1 illustrates a cable modem system architecture 100 according to the present invention. System 100 comprises three major subsystems: cable modem engine 110; data networking engine 120; and advanced crypto engine 130. The functional sub-components of these three-subsystems are illustrated in greater detail in FIG. 2.

Cable modem engine 110 implements the entire DOCSIS cable modem functionality and is further divided into three functional blocks: DOCSIS PHY layer 112; DOCSIS MAC processor 114 and DOCSIS controller 116. DOCSIS PHY layer 112 comprises a hardware transmitter and receiver. In one implementation, it is for a DOCSIS 2.0-compliant PHY. As seen in FIG. 1, DOCSIS PHY layer 112 receives downstream data, transmits upstream data and receives and transmits voice data from/to an external source. In one implementation, the external source is a HFC (hybrid fiber coax) cable employing both fiber optic and coaxial cable as an effective means for delivering combined data, video, voice, CATV and other communications.

Figure 2:
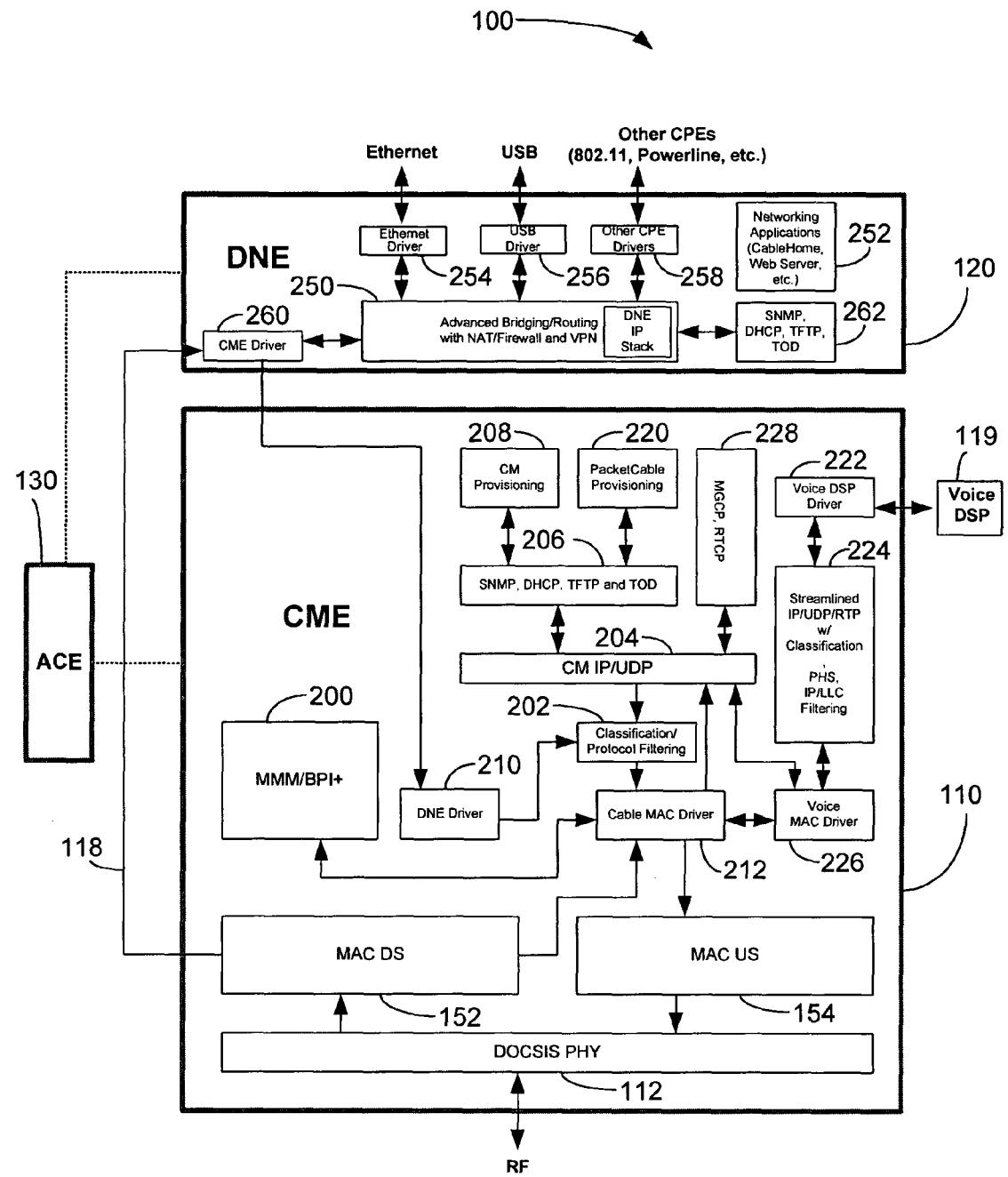
FIG. 2 is a functional block diagram implementing the cable modem architecture of FIG. 1.

Processor 114 implements real-time critical MAC functions for both upstream (US) and downstream (DS) communications. These functions include US and DS synchronization, DS MAC address filtering, DS protocol filtering, US and DS PHS, concatenation, fragmentation, MAP processing, US transmission scheduling, as well as DOCSIS link-layer DES encryption and decryption. Processor 114 receives downstream data from, provides upstream data to and exchanges voice data in both directions with DOCSIS PHY 112. It also receives upstream data from, and exchanges voice data in both directions with, controller 116. To increase downstream throughput, all processing of DS PDU (protocol data unit) packets is done within processor 114 without involving controller 116. After being processed, DS PDU packets are forwarded by processor 116 directly to data networking engine 120 along path 118, bypassing controller 116. In one implementation, processor 114 is an ARM9TDMI-based RISC processor. In FIG. 2, processor 114 is represented by MAC DS block 152 and MAC US block 154.

Controller 116 receives US PDU packets from data networking engine 120. As previously described, DS PDU packets are forwarded by processor 114 to data networking engine 120 without involvement of controller 116. In one implementation, controller 116 is an ARM940-based RISC processor. Controller 116 implements the following DOCSIS (blocks 200-212) functions: MAC management message (MMM) processing (ranging, registration, UCD, UCC, DCC, DCI, UP-DIS, DSx and BPI+) (functional block 200 of FIG. 2), IGMP, MAC address learning, classification, US protocol filtering (functional block 202 of FIG. 2) and CM IP stack and software downloading. Functional block 204 carries out cable modem IP/UDP functions, functional block 206 carries out SNMP, DHCP, TFTP and TOD functionality and functional block 208 is responsible for cable modem provisioning. Controller 116 also includes a data network engine driver 210 in communication with data network engine 120 and cable MAC driver 212.

In addition, in order to minimize the latency and jitter of voice packets, controller 116 also implements all PacketCable functionality. In FIG. 2, PacketCable functionality is represented by functional blocks 220-228. These PacketCable functions include provisioning (block 220), security and signaling. Functional blocks 222 (voice DSP driver), 224 (streamlined IP/UDP/RTP with classification; PHS, IP/LLC filtering) and 226 (voice MAC driver) interface with external voice DSP 119. Additionally MGCP and RTCP functions are provided by functional block 228.

Data networking engine 120 is responsible for all data networking processing including advanced multi-port bridging/routing with NAT/firewall and VPN (block 250) and home networking applications (CableHome, Web Server, etc.) (block 252). In one implementation, the entire embedded portal services (PS) functionality of the CableHome specification is contained within data networking engine 120, with the CableHome functionality being completely decoupled from the PacketCable and DOCSIS functionality provided by cable modem engine 110. As a result of the virtual de-coupling from cable modem engine 110, data networking engine 120 can be independently software-upgraded without impacting the functionality of cable modem engine 110 (and vice versa).

As seen in FIG. 1, data networking engine is capable of additional CPE functionality such as Ethernet, USB and other LAN I/F communications (802.11, Bluetooth, Powerline, etc.), with appropriate CPE drivers 254, 256, 258 being provided to support such communications. Additionally, cable modem engine driver 260 communicates with cable modem engine 110 and functional block 262 provides SNMP, DHCP, TFTP and TOD functionality.

Advanced crypto engine 130 provides hardware support for crypto functions. These include common crypto functions required by the baseline DOCSIS link-layer security, PacketCable voice security and data-networking security (e.g. VPN). These functions include DES/3DES, AES and HMAC-MD5/SH-1.

The architecture of gateway cable modem 100 addresses the objectives set forth in the "Background" section above as follows:

Functional Partitioning. Cable modem 100 completely partitions data networking functions (advanced bridging/routing, NAT/firewall, VPN, web server and CableHome applications) from DOCSIS cable modem functionality. This is accomplished by localizing data networking functions in the data networking engine processor and localizing cable modem functions in the cable modem engine processor. Additionally, PacketCable VoIP functionality (embedded MTA) is implemented within cable modem engine 110 to address the facts that embedded MTA is closely coupled with cable modem MAC services and that the latency and jitter of voice packets needs to be minimized.

Flexibility. Since the data networking and cable modem functions are decoupled and implemented in different processors 110 and 120, independent software upgrading and maintenance of these functions is feasible. From a development standpoint, the architecture can facilitate different software-partnering models, such as complete in-house development, software-components licensing and OEM vendor-differentiating design. In particular, data networking engine 120 provides third parties and OEMs with a dedicated computational platform to develop advanced services outside of the baseline cable modem and VoIP/PacketCable services, minimizing their support dependency on the cable modem provider. Moreover, the software architecture within cable modem engine 110 is designed in a modular way so that the PacketCable E-MTA can be implemented with minimum impact on the cable modem.

Performance. System 100 is able to support a large number of simultaneous data-application sessions originated from/terminated on multiple CPE devices. Its performance is enhanced by the pipe-lining nature of system 100: the processing-intensive functions of the cable modem and data networking are rationally distributed among three different processors: DOCSIS MAC processor 114 (ARM #2); DOCSIS controller 116 (ARM #1); and data networking engine 120 (ARM #3), according to their orders in the packet flow. To further boost downstream throughput, the downstream PDU packets are directly forwarded from the DOCSIS MAC processor 114 to the data networking engine 120 without going through DOCSIS controller 116. This is made possible by exploiting the asymmetric nature of the DOCSIS US/DS 152 and 154. In addition, the data path for voice packets is laid entirely within cable modem engine 110 and is optimized to reduce delay and jitter.

Cost. A chip implementing cable modem system 100 will have only a small incremental hardware cost/functional increase over current stand-alone cable modem chips. The major cost difference relative to current chips is the addition of another ARM940-type processor to the chip.

Software Re-Use. Existing cable modem software may be carried over to system 100 without major or drastic changes. Existing software running on PCD network processors may be easily ported to run on data networking engine 120 without major adaptation.

While various embodiments of the invention have been described, it will be apparent to those of ordinary skill in the art that many more embodiments and implementations are possible that are within the scope of this invention.

What is claimed is:

1. A cable modem system comprising:
    a data networking engine implemented in a first circuit that includes at least one processor, the data networking engine programmed with software that when executed by the at least one processor of the first circuit causes the data networking engine to perform home networking functions including interfacing with customer provided equipment, wherein the at least one processor is a RISC processor;
    a cable modem engine implemented in a second circuit that includes at least one processor, the second circuit being separate from the first circuit, the cable modem engine including a DOCSIS PHY layer, a DOCSIS controller, and a DOCSIS controller and programmed with software that when executed by the at least one processor of the second circuit causes the cable modem engine to perform cable modem functions other than the home networking functions performed by the data networking engine, the cable modem functions including interfacing with cable media, the cable modem engine configured to enable upgrades to its software in a manner that is independent of upgrades to the software of the data networking engine; and
    a data bus that connects the data networking engine to the cable modem engine, wherein the cable modem functions performed by the cable modem engine are completely partitioned from the home networking functions performed by the data networking engine;
    wherein the DOCSIS MAC processor is configured to process downstream PDU packets and forward the processed packets directly to the data networking engine without the involvement of the DOCSIS controller in order to boost downstream throughput.

2. A cable modem system as claimed in claim 1, wherein all DOCSIS functions are localized in the cable modem engine.

3. A cable modem system as claimed in claim 2, wherein VoIP functionality is embedded in the cable modem engine.

4. A cable modem system as claimed in claim 1, and further comprising an advanced crypto engine configured to perform all crypto functions for both the data networking engine and the cable modem engine, the advanced crypto engine being separate from both the data networking engine and the cable modem engine.

5. A cable modem system as claimed in claim 1, wherein the DOCSIS PHY layer includes a hardware transmitter and receiver.

6. A cable modem system as claimed in claim 1, wherein all VoIP functionality is implemented in the DOCSIS controller.

7. A cable modem system as claimed in claim 6, wherein the VoIP functionality is in conformance with the PacketCable specification.

8. A cable modem system as claimed in claim 1, wherein the data networking engine is configured to perform all data networking processing including advanced multi-port bridging routing with NAT/firewall and VPN, and home networking applications.

9. A cable modem system as claimed in claim 8, wherein the data networking engine comprises the entire embedded portal services functionality of the CableHome specification.

10. A cable modem system as claimed in claim 1, wherein with regard to the cable modem engine:
    the DOCSIS PHY layer includes a transmitter and receiver;
    the DOCSIS MAC processor is configured to implement real-time MAC functions for both upstream and downstream communications; and
    the DOCSIS controller is configured to implement VoIP functionality; and wherein the data networking engine includes a RISC processor configured to implement a majority of data networking processing and home networking applications decoupled from the implementation of the MAC functions and the VoIP functionality of the cable modem engine.

11. A cable modem system as claimed in claim 10, wherein the DOCSIS controller is configured to provide VoIP functionality in accordance with the PacketCable specification, wherein the data networking engine is configured to provide the embedded portal services functionality of the CableHome specification, and wherein the CableHome functionality provided by the data networking engine is completely decoupled from the PacketCable and DOCSIS functionality provided by the cable modem engine.

12. A cable modem system as claimed in claim 11, wherein the DOCSIS MAC processor is an ARM9TDMI-based RISC processor, and wherein the DOCSIS controller is an ARM940-based RISC processor.

13. A cable modem system as claimed in claim 1, wherein the data networking engine includes consumer provided equipment drivers including a USB driver and an Ethernet driver and the data networking engine is configured to provide the embedded portal services functionality of the CableHome specification, wherein the DOCSIS controller is configured to provide VoIP functionality in accordance with the PacketCable specification, and wherein the CableHome functionality provided by the data networking engine is completely decoupled from the PacketCable and DOCSIS functionality provided by the cable modem engine.

14. A method of cable modem operation comprising:
    executing, via at least one processor of a first circuit that implements a data networking engine, first software that causes the data networking engine to perform home networking functions including interfacing with customer provided equipment, wherein the at least one processor is a RISC processor;
    executing, via one or more processors of a second circuit that implements a cable modem engine programmed with second software, the second software to cause the cable modem engine to perform cable modem functions other than the home networking functions performed by the data networking engine, the cable modem functions including interfacing with cable media, the cable modem engine configured to enable upgrades to its software in a manner that is independent of upgrades to the software of the data networking engine, wherein the second circuit is separate from the first circuit, and wherein the cable modem engine includes a DOCSIS PHY layer, a DOCSIS controller and a DOCSIS controller;
    connecting, via a data bus, the data networking engine to the cable modem engine, wherein the cable modem functions performed by the cable modem engine are completely partitioned from the home networking functions performed by the data networking engine;
    processing, via the DOCSIS MAC processor, downstream PDU packets and forwarding the processed packets directly to the data networking engine without the involvement of the DOCSIS controller in order to boost downstream throughput.

15. A method of cable modem operation as claimed in claim 14, further comprising:

providing a flexible and partitioned cable modem gateway comprising:
provided data and home networking functionality in the data networking engine;
providing DOCSIS and VoIP functionality in the cable modem engine; and
partitioning the data networking engine from the cable modem engine so that the data and home networking functionality is completely decoupled from the DOCSIS and VoIP functionality.

16. A method as claimed in claim 14, further comprising:
providing VoIP functionality in accordance with the PacketCable specification in the DOCSIS controller; and
providing the embedded portal services functionality of the CableHome specification in the data networking engine;
wherein the CableHome functionality provided by the data networking engine is completely decoupled from the PacketCable and DOCSIS functionality provided by the cable modem engine.

17. A method as claimed in claim 14, further comprising:
providing the embedded portal services functionality of the CableHome specification in the data networking engine; and
providing VoIP functionality in accordance with the PacketCable specification in the DOCSIS controller;
wherein the data networking engine includes consumer provided equipment drivers including a USB driver and an Ethernet driver; and
wherein the CableHome functionality provided by the data networking engine is completely decoupled from the PacketCable and DOCSIS functionality provided by the cable modem engine.

18. A cable modem system comprising:
a data networking engine implemented in a first circuit that includes at least one processor, the data networking engine programmed with software that when executed by the at least one processor of the first circuit causes the data networking engine to perform home networking functions including interfacing with customer provided equipment;
a cable modem engine implemented in a second circuit that includes at least one processor, the second circuit being separate from the first circuit, the cable modem engine programmed with software that when executed by the at least one processor of the second circuit causes the cable modem engine to perform cable modem functions other than the home networking functions performed by the data networking engine, the cable modem functions including interfacing with cable media, and the cable modem engine configured to enable upgrades to its software in a manner that is independent of upgrades to the software of the data networking engine, the cable modem engine including a DOCSIS controller and a DOCSIS MAC processor, the DOCSIS MAC processor configured to process downstream PDU packets and forward the processed packets directly to the data networking engine without the involvement of the DOCSIS controller in order to boost downstream throughput; and
a data bus that connects the data networking engine to the cable modem engine, wherein the cable modem functions performed by the cable modem engine are completely partitioned from the home networking functions performed by the data networking engine.

19. A cable modem system as claimed in claim 18, wherein all DOCSIS functions are localized in the cable modem engine.

20. The cable modem system as claimed in claim 18 wherein the DOCSIS MAC processor is configured to implement real-time MAC functions for both upstream and downstream communications.

* * * * *